(12) United States Patent
Kiener et al.

(10) Patent No.: US 7,510,057 B2
(45) Date of Patent: Mar. 31, 2009

(54) PARKING BRAKE

(75) Inventors: Wolfgang Kiener, Berlin (DE); Stephan Lange, Berlin (DE); Johann Baumgartner, Moosburg (DE); Eduard Gerum, Rosenheim (DE); Michael Herges, Korntal-Muenchingen (DE); Dirk Ganzhorn, Munich (DE); Bence Csàk, Budapest (HU); Nicolas Savagner, Le Mesnil Eudes (FR); Uwe Neumann, Bamberg (DE); Matthias Gradl, Sesslach (DE); Matthias Schaefer, Coburg (DE)

(73) Assignee: Knorr-Bremse Systeme Fuer Nutzfahrzeuge GmbH, Munich (DE)

( * ) Notice: Subject to any disclaimer, the term of this patent is extended or adjusted under 35 U.S.C. 154(b) by 102 days.

(21) Appl. No.: 11/724,152

(22) Filed: Mar. 15, 2007

(65) Prior Publication Data
US 2007/0246309 A1  Oct. 25, 2007

Related U.S. Application Data

(63) Continuation of application No. PCT/EP2005/009829, filed on Sep. 13, 2005.

(30) Foreign Application Priority Data

Sep. 16, 2004  (DE) .................. 10 2004 044 940

(51) Int. Cl.
*B62C 7/02* (2006.01)
*B60T 1/02* (2006.01)
*F16D 65/24* (2006.01)
*B60T 13/04* (2006.01)

(52) U.S. Cl. ................... 188/69; 188/82.84; 188/166; 188/170; 188/31

(58) Field of Classification Search ............... 188/31, 188/60, 68, 69, 82.1, 82.8, 82.9, 82.84, 166, 188/170, 171, 173
See application file for complete search history.

(56) References Cited

U.S. PATENT DOCUMENTS 2,873,822 A  *  2/1959  Sloan .................. 188/68

(Continued)

FOREIGN PATENT DOCUMENTS

AU          38094/78        1/1980

(Continued)

OTHER PUBLICATIONS

International Search Report dated Dec. 27, 2005 with English translation of relevant portion (Six (6) pages).

(Continued)

*Primary Examiner*—Thomas J Williams
(74) *Attorney, Agent, or Firm*—Crowell & Moring LLP

(57) ABSTRACT

A parking brake for a commercial vehicle equipped with an air-operated service brake is configured in such a way that the actuating energy for the brake is reduced in comparison to a configuration with a spring brake cylinder, while the installation space in the wheel area is minimized. Primary functional parts of the parking brake include an inner race and an outer race, which delimit an annular gap. Displaceable tapered-roller bearings are located in the annular gap. To adopt a release position in opposition to the action of a compression spring, the tapered roller bearings are disengaged from the conical surfaces of the inner race and the outer race.

8 Claims, 1 Drawing Sheet

U.S. PATENT DOCUMENTS

| | | | | |
|---|---|---|---|---|
| 3,002,589 | A | * 10/1961 | Cook | 188/69 |
| 3,842,947 | A | * 10/1974 | Hofmann | 188/69 |
| 4,934,490 | A | 6/1990 | Chang | |
| 5,103,941 | A | * 4/1992 | Vranish | 188/171 |
| 6,250,433 | B1 | 6/2001 | Sealine et al. | |
| 6,273,221 | B1 | * 8/2001 | Schmidt | 188/170 |
| 6,536,571 | B1 | 3/2003 | Myrick | |

FOREIGN PATENT DOCUMENTS

| | | |
|---|---|---|
| EP | 0 518 008 A1 | 12/1992 |
| WO | WO 03/085280 A1 | 10/2003 |

OTHER PUBLICATIONS

PCT/IB/338 and PCT/IPEA/409 (Five (5) pages).

* cited by examiner

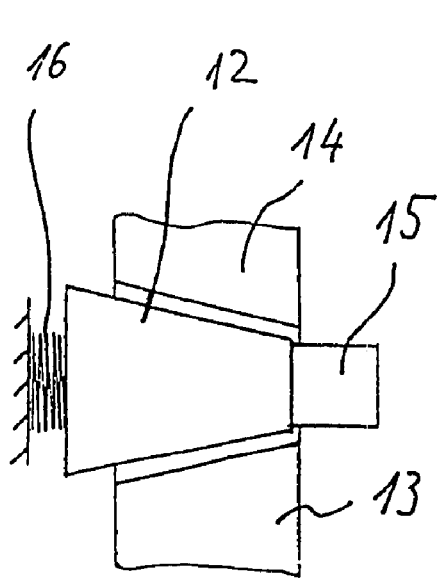
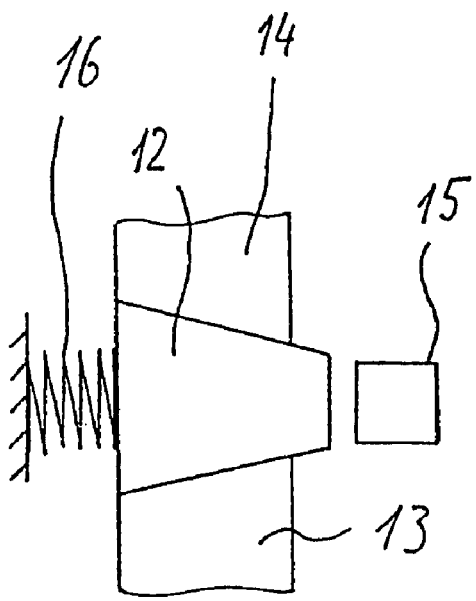
Fig. 2  Fig. 1
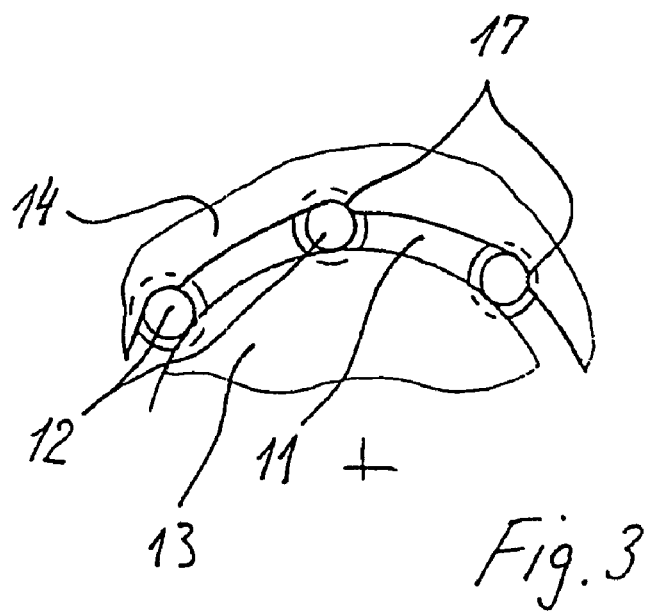
Fig. 3

PARKING BRAKE

This application is a continuation of international PCT application PCT/EP2005/009829, filed Sep. 13, 2005, the entire disclosure of which is incorporated herein by reference, which in turn claims the priority of German application DE 10 2004 044 940.6, filed Sep. 16, 2004.

This invention relates to a parking brake device for a vehicle, and in particular a utility vehicle, having a plurality of wheels and associated wheel hubs.

Utility vehicles having total permissible weights in upper ranges are usually equipped with service brakes which can be actuated with compressed air. Utility vehicles of this type are generally used either as so-called semi-trailers and/or in trailer applications.

A service brake which can be actuated with compressed air is composed of brake devices which are assigned to the individual wheels and which are in any case partially equipped with a spring combination brake cylinder. In order to secure the parked vehicle, the spring of the spring store section of the brake cylinder acts on the brake element, for example on the brake disks or on the brake pads. In addition, in an arrangement of this type, it is ensured that each braking device is moved into the braking position if a defect occurs in the compressed air supply. The holding force of each brake device in the parked state of the utility vehicle is accordingly generated mechanically.

So that the spring store cylinder has no effect during driving or in traffic-related interruptions in driving, the spring store cylinder is pre-loaded by a piston, which can be acted on with compressed air, to such an extent that no force acts from the spring of the spring brake cylinder on the actuating element of the brake device. The vehicle wheel is therefore released to run freely.

Brakes of this type with spring combination cylinders have for a long time proven themselves in an optimum way. One advantage of a solution of this type is that the existing service brake is also utilized as a parking brake, and the service brake can be of very robust and reliable design.

Less advantageous, however, are the very large installation space requirement and the high weight of the spring combination cylinder. In addition, in states of driving readiness of the utility vehicle, each spring brake cylinder must be constantly acted on with compressed air, and therefore the consumption is correspondingly high. In addition, a separate compressed air supply circuit must be constructed for the spring brake cylinder.

For the above reasons, other solutions have already been proposed for a parking brake device. For example, self-boosting systems are known in which the braking action is provided by means of clamping effects or positive locking. The required energy for actuating such systems is considerably lower than for the spring brake cylinders. Systems of this type do however have disadvantages. In positively locking systems, the park position cannot be found in a stepless manner, that is to say, the vehicle to be secured must roll, even if only a small distance, before the positively locking position is found. It is additionally disadvantageous that systems of this type are extremely sensitive to the engagement of the components which provide the positive locking, because when the positive locking is found as the utility vehicle is still rolling, the energy of the rolling utility vehicle must be absorbed by the components, which frequently leads to their failure. For these reasons, systems of this type have hitherto not been adopted in practice.

Also known are separately arranged parking brake devices which utilize self-boosting effects. These arrangements have the fundamental disadvantage that a second brake device must be provided in addition to the service brake, which requires additional installation space.

Against this background, it is an object of the invention to provide a parking brake device which has a small installation space requirement and preferably also has a low demand for actuating energy.

This object is achieved by means of at least one freewheel lock which is preferably integrated into at least one or more of the wheel hubs or arranged in the region of the wheel hubs.

The freewheel lock can be arranged in a compact fashion on the wheel hub and can in this way be provided in a favorable manner in terms of installation space and cost.

The freewheel lock preferably has an inner ring and an outer ring on the wheel hub, with faces which are situated so as to face toward one another formed as opposing cone faces so as to form an annular gap. A plurality of brake bodies which are designed as conical rollers are arranged between the faces, and the conical rollers can be moved by means of associated actuating members into a release position and into a braking position.

The main functional parts of the parking brake device for a vehicle wheel are now the inner and outer rings and a plurality of conical rollers.

Components of this type are not only easy to produce but can also be of extremely compact design as a structural unit, so that an extremely small installation space is required despite a parking brake device which correspondingly operates separately from the service brake.

Only an extremely short travel is required to move the conical rollers into the release position, since the outer lateral surfaces of the conical rollers come out of contact with the conical faces of the inner and outer rings even after a short travel. The release forces are also extremely low.

In a preferred embodiment, the actuating members are likewise pneumatically actuated, but with the required energy being significantly lower than in the case of a service brake with a spring store cylinder. In addition, it is likewise ensured that the parking brake device is activated automatically in the event of failure of the compressed air supply. The actuating members could also cause a displacement of the inner and the outer rings in such a form that the brake bodies can be moved into the release position or into the braking position. In one embodiment, which is preferred in design terms, the conical rollers can be moved in their longitudinal direction, and the inner and outer rings are prevented from being displaced axially. In a further embodiment, each conical roller can be moved into the braking position by means of at least one pressure spring. The movement of the conical rollers into the release position is then carried out counter to the action of the pressure springs.

For this purpose, the actuating members are embodied as pneumatically operating actuating members, that is to say, they are acted on at the end side with compressed air during normal driving operation.

The parking brake device for each wheel is also preferably installed in the hub of the wheel. The conicity of the inner and outer rings and of the conical rollers already provides a sufficient braking action, although in a further embodiment, the inner rings, the outer rings, or both the inner and outer rings are also provided with clamping ramps so as to further improve the action. The clamping ramps are preferably assigned to the conical inner face of the outer ring and correspondingly form a narrowing of the annular gap in defined regions. Here, the clamping ramps can be designed so as to be either single-acting or double-acting. Blocking or wedging of the wheel in both rotational directions is then provided.

It is generally known that the braking action by the inner and outer rings in connection with the conical rollers is inversely proportional to the cone angle, that is to say, the smaller the cone angle, the greater the force which is required to move the parking brake device into the release position. The cone angle is therefore to be selected, on the one hand, such that a reliable braking action is obtained when the utility vehicle is parked, but also, on the other hand, such that the force required for moving into the release position is kept within limits.

The force required for moving the parking brake device into the release position tends to zero if the value of the tangent as an angular function of the cone angle becomes equal to the friction value between the conical rollers and the faces of the inner and outer rings. A sufficient braking action is then, however, no longer provided. It is therefore provided that the cone angle, taking into consideration the possible deviations of the friction coefficient, is smaller by a defined magnitude than the limit angle arising from the value of the tangent. This ensures that a sufficient braking action is still obtained even with the lowest possible friction values. It is then necessary, in order to determine the forces required for moving the parking brake device into the release position, to determine the clamping force which is obtained with the highest possible friction value.

In order to obtain a reliable braking action with, at the same time, the lowest possible force for moving into the release position, the friction coefficients on the rolling bodies of the arrangement must be kept within narrow limits. The parking brake device is therefore arranged in a substantially closed housing, since hermetic protection can then be assumed. The parking brake device forms a structural unit together with the associated wheel bearing of the respective wheel, which structural unit is arranged in the substantially closed housing.

The invention is explained in yet more detail with reference to the appended drawings.

BRIEF DESCRIPTION OF THE DRAWINGS

FIG. 1 shows a conical roller, which is inserted in the annular gap between an outer and an inner ring, in the braking position, FIG. 2 shows the arrangement of FIG. 1 in the release position, and FIG. 3 is a highly schematic partial end view of the parking brake device according to the invention.

DETAILED DESCRIPTION OF THE DRAWINGS

The parking brake device according to the invention substantially contains a plurality of conical rollers, which are arranged with uniform angular spacing relative to one another in an annular gap 11, an inner ring 13 and an outer ring 14. The faces, which face toward one another, of the inner ring 13 and of the outer ring 14 are of conical design corresponding to the cone angle of each conical roller 12. The parking brake device is also equipped with a pneumatically operating actuating member 15 which acts on the smaller end face of each conical roller 12. In this way, the conical rollers 12 are moved from the braking position illustrated in FIG. 1 into the release position illustrated in FIG. 2. This takes place counter to the action of a pressure spring 16 which acts on the larger face of the respective conical roller 12. It can be gathered from FIGS. 1 and 2 that, in the event of a drop in the pressure acting on the actuating members 15, the conical rollers 12 are moved into the braking positions by the actions of the pressure spring 16.

In order to further increase the braking actions of the conical rollers 12, it is provided, in the embodiment of FIG. 3, that a clamping ramp 17 is provided on the cone face of the outer ring 14 so as to adjoin each conical roller 12 at one side. It can also be gathered from FIG. 3 that the inner ring 13 can be rotated counterclockwise, whereas the clamping ramps are active in the case of a rotation in the opposite direction, so that the conical rollers 12 become wedged. The combination of the inner ring 13, the outer ring 14 and the conical rollers 12 could also be referred to as a freewheel lock.

The invention is not restricted to the illustrated exemplary embodiments, although is essential to install a parking brake device in the wheel hub of a vehicle wheel which has separate brake elements 12, 13, 14 which are not part of the pneumatically operating service brake but are moved into a release position when a vehicle is started up.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A parking brake device for a vehicle having a plurality of wheels, having at least one freewheel lock, the freewheel lock comprising:
   an inner ring, and
   an outer ring,
   wherein the inner ring and the outer ring have faces which are situated so as to face toward one another and are formed as opposing cone faces forming an annular gap,
   wherein a plurality of brake bodies designed as conical rollers are arranged between said faces,
   wherein the conical rollers are movable by associated actuating members into a release position and into a braking position, and
   wherein a cone angle of each conical roller is smaller by a defined magnitude than a limit angle arising from a value of the tangent taking into consideration friction angles between the conical rollers and the cone faces of the inner ring and the outer ring.

2. The parking brake device as claimed in claim 1, wherein the conical rollers can be moved in their longitudinal direction, and wherein the inner ring and the outer ring are prevented from being displaced axially.

3. The parking brake device as claimed in claim 2, wherein each conical roller can be moved into the braking position by at least one pressure spring.

4. The parking brake device as claimed in claim 1, wherein each actuating member is a pneumatically operating actuating member.

5. The parking brake device as claimed in claim 1, wherein at least one of the inner and outer rings has clamping ramps for the conical rollers.

6. The parking brake device as claimed in claim 5, wherein the clamping ramps are designed so as to be single-acting or double-acting.

7. The parking brake device as claimed in claim 1, further comprising a substantially closed housing in which the parking brake device is arranged.

8. The parking brake device as claimed in claim 5, wherein the at least one ring is the outer ring.

* * * * *